Dec. 26, 1950     L. EDLAND     2,535,124
METHOD OF PRODUCING STABILIZED DRIVE BELTS
Filed July 11, 1947
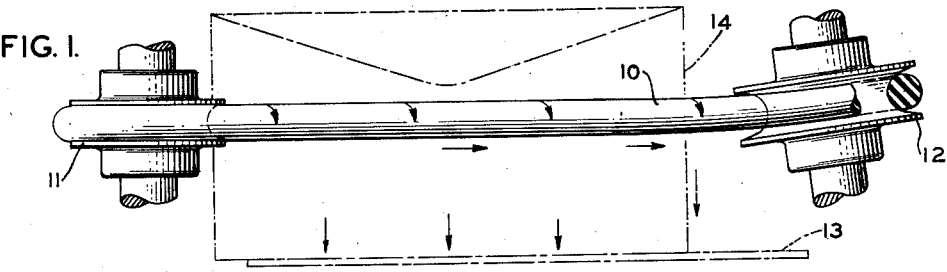
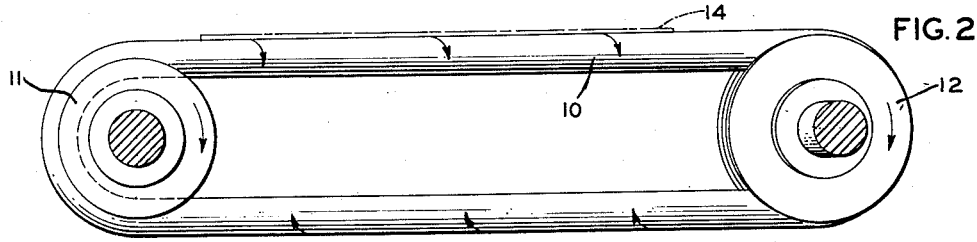
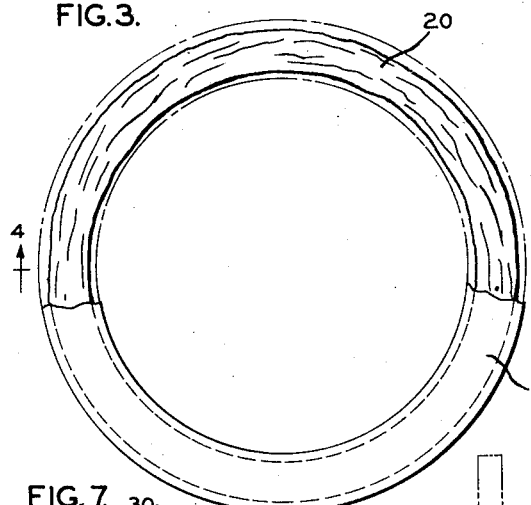
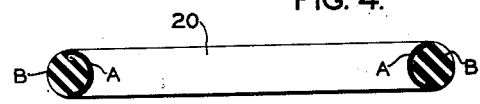
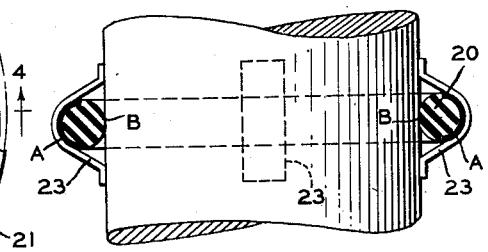
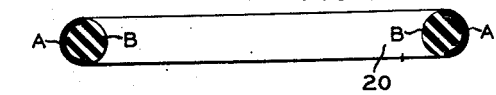
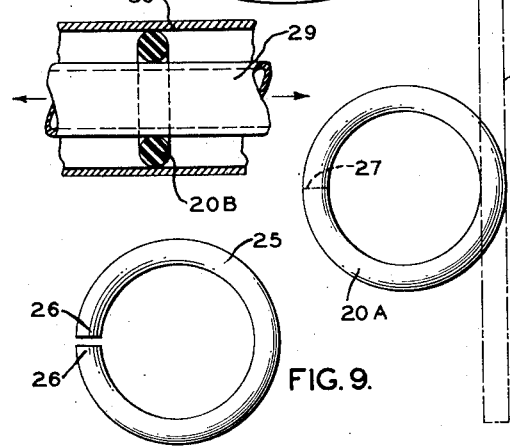
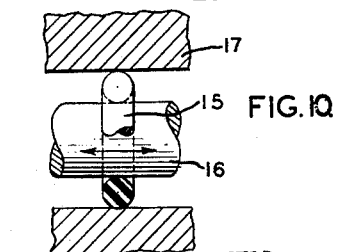
INVENTOR.
LAURENCE EDLAND
BY *John L. Sterling*
ATTORNEY Patented Dec. 26, 1950

2,535,124

UNITED STATES PATENT OFFICE 2,535,124

METHOD OF PRODUCING STABILIZED DRIVE BELTS

Laurence Edland, Glen Ridge, N. J., assignor to Rodic Rubber Corporation, New Brunswick, N. J., a corporation of Delaware Application July 11, 1947, Serial No. 760,241

8 Claims. (Cl. 18—53)

This invention relates to rubber drive belts and oil sealing rings or the like, that under working conditions will roll or rotate without distortion.

Driving belts are used, for example, in letter opening machines to feed envelopes in the direction of travel of the belt to a slitting member, and also laterally with respect to the belt for register with an edge guage which aligns the edges of the envelopes to be cut. These belts pass over spaced pulleys, one of which is disposed obliquely to the direction of travel of the belt so that, in addition to longitudinal travel, a rotary motion is imparted to the belt by frictional engagement with the sides of the pulley groove. This twisting tendency, induced by the obliquely disposed pulley, gradually builds up in the structure of the belt a torsional stress, which, upon reaching a limit, causes distortion of the belt and jumping thereof which produces irregular feed of the letters and sometimes snapping of the belt off either or both pulleys to relieve the stress that has been built up.

This torsional stress is also evident in rubber rings that are used about a reciprocating shaft and in contact with a housing to provide an oil seal, and continued reciprocatory rolling action of the ring causes the stress to build up with the result that the sealing ring becomes distorted and breaks the oil seal. The ring and the belt structure lack stability sufficient to cause the twisting stress to be distributed evenly throughout the length thereof. It is necessary that the inherent desirable characteristic qualities of the rubber be maintained during any process or method employed in producing a belt or ring, in which torsional stresses may be stabilized to such an extent that the ring or belt when rolled will turn evenly throughout its length and without lag of any of the sections thereof, which would eventually build up into a structure distorting stress.

It is an important object of the invention, therefore, to subject rubber in ring or belt form to a process that will result in a product that is free from distortion under working conditions.

A further object of the invention is to produce in the rubber structure plural conditions of stability, whereby a tension will be inherent in the finished product that will assist the entire structure in quickly and evenly yielding to a torsional pressure, so that it will roll in all sections simultaneously and without the lag that results in the distortion referred to.

Still further objects of the invention are to provide methods of treating the rubber in ring or belt form, which methods may vary physically, but still be effective in imparting to the product successive stabilities that coact under working conditions to prevent any build-up of objectionable and distortion provoking stresses; to provide a process or method of curing the rubber in successive stages which will involve a minimum number of steps and a minimum amount of operational control; to also provide a method that may be applied to rubber structures generally, so that the stresses produced by torque, applied under operating conditions instead of causing distortion, will assist in preserving the normal equilibrium of the rubber body, and to form belts or rings so that a rolling action thereof will be transmitted directly and uniformly about the peripheral areas thereof.

Other objects and details of the invention and the process of producing the same will be apparent from the following description when read in connection with the accompanying drawing, in which Fig. 1 is a plan view, partly in section, showing a rubber ring, constructed in accordance with the process used, under working conditions as a belt;

Fig. 2 is a side view of the pulley-operated belt shown in Fig. 1;

Fig. 3 is a plan view of a ring of uncured rubber and part of a ring mold in which it is first cured;

Fig. 4 is a section on the line 4—4 of Fig. 3, showing the ring after it has been subjected to the first step of the process and indicating diagrammatically one position of stability;

Fig. 5 is a section similar to Fig. 4 but showing the ring rolled 180° about its own axis and secured to a mandrel, the twist being diagrammatically illustrated;

Fig. 6 is a view showing the ring of Fig. 5 removed from the mandrel and illustrating diagrammatically another position of stability, after completion of the process;

Fig. 7 is a view in sectional elevation of a moving mandrel and ring providing an alternate second step in the process;

Figs. 8 and 9 are diagrammatic views illustrating the differences in the behavior of rings produced by the different steps of the process; and Fig. 10 is a fragmentary view in section showing the use of the ring as an oil seal.

Referring to the drawing in detail, 10 indicates a rubber ring passing over pulleys 11 and 12 which may represent the envelope feeding means of a letter opener, for example, and which may have a guage plate 13 against which the envelopes 14 are laterally pushed, as indicated by the arrows in Fig. 1, by the action of said belt 10 as the latter feeds the envelopes forwardly to an edge slitter (not shown). A further application of a ring, formed in accordance with the process herein described, is shown in Fig. 10 in which the ring 15 encircles a reciprocating shaft 16 and engages the wall of a housing 17 to form an oil seal. In the instance of the letter opener, the pulley 12, which is arranged obliquely to the pulley 11, causes the belt to roll about its own axis to provide a sidewise or lateral feed of the envelopes, as well as a longitudinal feed in the direction of belt travel as indicated by the arrows in Figs. 1 and 2. In the instance of the oil seal, the reciprocating motion of the shaft 16 and the frictional resistance offered by the surface of the housing 17 causes the ring 15 to roll or revolve about its own longitudinal axis, so that an effective oil seal is maintained at all times.

Heretofore, in the operation of these devices, the belts or rings, due to torsional stresses set up therein by the rolling action, would become distorted and in the letter opener would jump off the pulleys and in the oil seal would permit leakage of oil along the shaft. Should one of these rings or belts be severed it would be found that the ends would not tend to spring apart as shown in Fig. 9, thus indicating that there existed in the rubber structure an inherent stress tending to keep the ring in circular form. In rolling action this stress would build up and cause the ring to snap as above noted. In the curing of the rubber, which may be referred to as vulcanization, the degree of heat applied and the time factor involved will produce rubber of different characteristics and it has been found that, through the process herein disclosed, a ring of rubber can be produced which lacks any tendency to distort, and may be used as a feeding device or oil seal without the objections present in known rings of like type.

Applicant refers to his treatment of the rubber as curing, and it is believed that the effect of heat may be to bring the rubber structure into a more highly dispersed and active form which combines more readily with sulphur. The cure, by the steps proposed herein, amounts to vulcanization, which has been held by some authorities in rubber chemistry to consist essentially in the transformation of the rubber structure into a more stable condition. By the process disclosed, a change in the ring is evident in its smooth working action without distortion, which is attributed to an alteration in the rubber structure produced by the process or method consisting of a series of steps or operations which starts with the placing of a quantity of rubber compound 20 (Fig. 3) in a ring mold 21. The rubber compound 20, with which the process begins, is substantially a commercial or simple rubber-sulphur mixture and the rubber may be either the natural rubber composition or a synthetic one, as desired. The term sulphur, as herein used, embraces all the known substitutes or vulcanizing agents that may be employed for the theoretical purpose of combining with the rubber to maintain the elasticity of the rubber while the plasticity thereof is decreased during different degrees of vulcanization.

In the first step of the process, the rubber 20 is semi-cured for approximately fifteen minutes at a temperature of about 300° F., during which time it is believed that about half of the sulphur combines with the rubber compound to produce the semi-cured ring shown in section in Fig. 4. By this first cure, the ring structure is given an initial stability or degree of semi-vulcanization which is graphically indicated in Fig. 4. The inner peripheral surface of the ring 20 is shown in heavier lines as at A to indicate the position to which the ring structure would automatically return were it twisted or rolled, and this position is the one which is referred to herein as the "position of initial stability" in order to distinguish it from another position to be later referred to.

In the next step, the elastic ring of Fig. 4, after cooling, is rolled or evenly twisted throughout its length and about its longitudinal axis 180°, so that the inner periphery A and the outer periphery B thereof change places. If the ring were released it would assume the Fig. 4 position, but it is held in rolled position on a mandrel 22 by any suitable securing means 23. In this rolled and secured condition the "position of initial stability" has been overcome, but the tendency of the ring to snap back to unrolled condition is inherent therein. The ring is then subjected to a cure of about forty minutes duration under approximately 55 lbs. of live steam, producing a temperature of substantially 302°. This effects a further and final cure which combines more of the sulphur with the molecular structure of the rubber with the result that, when the ring 20 is removed from mandrel 22, it will have acquired a "position of normal stability" and will have no tendency to automatically snap back to the position shown in Fig. 4.

While the position of initial stability has been overcome by the manual effort expended in rolling the ring 180°, and is rendered ineffective to cause the ring to snap back to its unrolled condition by the second cure, nevertheless the tendency of the ring to assume a position of initial stability is inherent therein, and acts to assist in rotation of the ring from its position of neutral stability under working conditions to thus prevent build-up of a twisting stress in the ring structure that is eventually relieved by distortion. Also, the steps of the process produce a loss of plasticity, and an increased resistance to deformation which causes any twisting force applied to one area of the ring to be effective throughout the length of the ring without appreciable lag to roll the ring in a uniform manner and prevent accumulation of said distorting stresses.

In the timing of the second cure it is preferable that the ring be vulcanized until it just attains its condition of normal stability, or until such time as the holding means 23 could be removed without the ring reverting to its position of initial stability. When the normal stability and initial stability just balance an ideal condition is established where, under working conditions, distortion is entirely absent. For evidence that dual stabilities may exist in the ring cured in accordance with the process, reference is made to the ring 25 in Fig. 9, which is one that has been subjected to one period of vulcanization, and in which a position of stability of the rubber structure is established that keeps the ends 26 of the severed ring close together and yieldably resists any tendency to open the ring. When the ring 20A, the product of the herein process, is severed as at 27, it springs open to a straight position as at 28. The ring 25 has a position of initial stability which tends to maintain the ring in circular shape. The ring 20A, when after the first step of the process is rolled through 180°, will be found to have an outer peripheral tension and an inner peripheral compression which is cured therein. When the ring is severed, both these stresses tend to equalize themselves and the ring assumes a straight shape as at 28. The positions of initial and normal stability include an outer tensional force and an inner compression force which continually counteract each other and permit rolling movement of the ring without distortion.

In Fig. 7 the ring 20B is produced by a process having a variable second curing operation. The ring is first semi-cured for a period of about fifteen minutes at approximately 300° F., and is then mounted on a reciprocating mandrel 29 in frictional rolling contact with an outer sleeve 30 and subjected to a cure of about forty minutes duration under approximately 55 lbs. of live steam producing a temperature of about 302° F. This rolling produces a ring having vulcanized therein a plurality of uniformly cured positions of normal stability which results in a smoother rolling motion of the ring under working conditions.

It is evident that in an art in which the changes in rubber structure produced by heat are not readily agreed upon by rubber chemists, the theory of operation of the device herein disclosed may be subject to alteration. In actual working operation belts or rings produced by this process are free from contortion and roll throughout the length thereof evenly and without lag with the result that, while a twisting effort is applied to the belt or ring under working conditions, this twist is not localized, but results in a complete roll of the ring in all parts thereof. The coactive operation of the different conditions of stability, as well as the degree of plasticity brought about by the steps of curing as set forth, it is believed, are responsible for the satisfactory behavior of the belt or ring under actual working conditions.

While there has been shown and described the fundamental novel features of the process steps as applied to belts and rings, it will be understood that various changes, and substitutions may be made in the length and degree of heat application involved in curing the product by those skilled in the art without departing from the spirit of the invention. It is the intention, therefore, to be limited only as indicated by the scope of the appended claims.

What I claim as new, and desire to secure by Letters Patent, is:

1. The process of producing an endless rubber ring free from contortive action induced by a rolling motion of the ring body about its own longitudinal axis under working conditions, which consists in first curing the ring to provide in the structure thereof a condition of initial stability, rotating the structure of the ring about the longitudinal axis of said body through substantially 180° and then subjecting the ring, while held in said rotated condition, to a second curing to provide in the structure thereof a condition of normal stability.

2. The process of producing an endless rubber ring free from contortive action induced by a rolling motion of the ring body about its own longitudinal axis under working conditions, which consists in curing the ring a first time to produce a semi-vulcanized body of relaxed condition, then rotating the ring about the longitudinal axis of the body thereof to interchange the position of the outer and inner peripheries thereof and produce a torsional stress in the body, then curing the ring a second time with a further degree of vulcanization to overcome the torsional stress tending to return the body to relaxed condition.

3. The process of producing an endless rubber ring to provide in the structure thereof a plurality of stable positions, which consists in subjecting the ring to successive curing steps and rotating the ring about the longitudinal axis of the body thereof substantially 180° and maintaining it in said rotated condition intermediate said steps.

4. The process of producing an endless rubber ring to provide in the structure thereof a plurality of stable positions, which consists in subjecting the ring to successive curing steps in different rotated positions of the body with respect to the longitudinal axis of said body thereof.

5. The process of producing an endless rubber ring free from contortive action induced by a rolling motion of the body about its longitudinal axis under working conditions, which consists in first curing the ring to provide therein a condition of initial stability, rotating the body of the ring about its longitudinal axis to interchange the inner and outer peripheries thereof against the resistance offered by the body and to set up therein a turning stress and then subjecting the ring so rotated to a second cure of sufficient duration to overcome the tendency of the body, to return to the position of initial stability, produced by said turning stress.

6. The process of producing an endless rubber ring free from contortive action induced by a rolling motion of the body of the ring on its longitudinal axis under working conditions, which consists in first curing the ring to provide therein a condition of initial stability, rotating the body of the ring about its own longitudinal axis to interchange the inner and outer peripheries thereof against the resistance to rotation offered by said body and to set up therein a torsional stress, then holding the body in said rotated position and then subjecting the body to a second cure of sufficient duration to prevent its voluntary return to the position of initial stability when no longer held.

7. The method of making an endless rubber ring which consists in subjecting rubber in ring form to a temperature of about 300° F. for approximately fifteen minutes, then rotating the body of the ring about its own longitudinal axis through substantially 180° of rotation, securing the ring in said rotated condition and then further subjecting the same to a temperature of about 302° F. for approximately forty minutes.

8. The method of making an endless rubber ring which consists in subjecting rubber in ring form to a temperature of about 300° F. for approximately fifteen minutes, mounting the ring in encircling position about a mandrel for rotating action of the body about its own longitudinal axis and then subjecting the ring during said rotating action to a temperature of about 302° F. for approximately forty minutes.

LAURENCE EDLAND.

REFERENCES CITED

The following references are of record in the file of this patent:

UNITED STATES PATENTS

| Number | Name | Date |
| --- | --- | --- |
| 26,265 | Gately | Nov. 29, 1859 |
| 2,093,904 | Bierer | Sept. 21, 1937 |
| 2,328,909 | Kilborn | Sept. 7, 1943 |
| 2,339,683 | Cox | Jan. 18, 1944 |
| 2,351,861 | Knowland | June 20, 1944 |